United States Patent
Kashima

(10) Patent No.: US 9,811,724 B2
(45) Date of Patent: Nov. 7, 2017

(54) INFORMATION PROCESSING APPARATUS, SYSTEM, AND NON-TRANSITORY COMPUTER READABLE MEDIUM

(71) Applicant: FUJI XEROX CO., LTD., Tokyo (JP)

(72) Inventor: Yozo Kashima, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 115 days.

(21) Appl. No.: 14/814,604

(22) Filed: Jul. 31, 2015

(65) Prior Publication Data

US 2016/0203363 A1 Jul. 14, 2016

(30) Foreign Application Priority Data

Jan. 14, 2015 (JP) ................................. 2015-004930

(51) Int. Cl.
*G06K 9/68* (2006.01)
*G06K 9/00* (2006.01)
*G06K 9/18* (2006.01)
*G06K 9/62* (2006.01)
*G06K 9/20* (2006.01)

(52) U.S. Cl.
CPC ..... *G06K 9/00442* (2013.01); *G06K 9/00449* (2013.01); *G06K 9/18* (2013.01); *G06K 9/2063* (2013.01); *G06K 9/6202* (2013.01)

(58) Field of Classification Search
CPC ........... G06K 9/00442; G06K 9/00449; G06K 9/00469
See application file for complete search history.

(56) References Cited

U.S. PATENT DOCUMENTS

| 8,023,155 | B2* | 9/2011 | Jiang | G06Q 10/10 358/3.22 |
| 2008/0244378 | A1* | 10/2008 | Chen | G06K 9/00456 715/226 |
| 2011/0102860 | A1* | 5/2011 | Tomizawa | G06K 9/00449 358/448 |
| 2012/0229872 | A1* | 9/2012 | Dolev | G06F 21/64 358/448 |
| 2012/0230577 | A1* | 9/2012 | Calman | G06Q 20/042 382/138 |

(Continued)

FOREIGN PATENT DOCUMENTS

| JP | 2005-31934 A | 2/2005 |
| JP | 2012-190313 A | 10/2012 |

*Primary Examiner* — Bhavesh Mehta
*Assistant Examiner* — Ian Lemieux
(74) *Attorney, Agent, or Firm* — Sughrue Mion, PLLC

(57) ABSTRACT

An information processing apparatus includes a recognition unit. The recognition unit has image recognition methods of plural types. The recognition unit recognizes, in a case where image data of a first document and image data of a second document are generated by a generation unit that reads a document and generates image data of the document, the type of the first document from the image data of the first document and recognizing the type of the second document from the image data of the second document using an image recognition method corresponding to the type of the first document among the image recognition methods of the plural types, the first document and the second document being included in plural documents.

12 Claims, 14 Drawing Sheets

| GROUP OF DOCUMENTS | ORDER | TYPE OF DOCUMENT | IMAGE RECOGNITION METHOD | RECOGNITION-USE INFORMATION |
|---|---|---|---|---|
| A | 1 | APPLICATION FORM A | QR CODE RECOGNITION | CODE INFORMATION: 0001 |
| | 2 | CERTIFICATE OF RESIDENCE | LIMITED AREA OCR | COORDINATES: (100, 2), (200, 18) CHARACTER STRING: CERTIFICATE OF RESIDENCE |
| | 3 | APPLICATION FORM FOR ACCOUNT OPENING | QR CODE RECOGNITION | CODE INFORMATION: 0001 |
| B | 1 | APPLICATION FORM B | QR CODE RECOGNITION | CODE INFORMATION: 0002 |
| | 2 | DRIVER'S LICENSE | LIMITED AREA OCR | COORDINATES: (50, 20), (60, 40) CHARACTER STRING: DRIVER'S LICENSE |
| | | HEALTH INSURANCE CARD | BACKGROUND COLOR ELIMINATION+ LIMITED AREA OCR | COORDINATES: (5, 5), (15, 10) CHARACTER STRING: HEALTH INSURANCE CARD |
| | 3 | CERTIFICATE OF RESIDENCE OF X PREFECTURE | LIMITED AREA OCR | COORDINATES: (100, 2), (200, 18) CHARACTER STRING: CERTIFICATE OF RESIDENCE |
| | | | RULED LINE RECOGNITION/ KEYWORD EXTRACTION | RULED LINE CHARACTERISTICS: [(0, 0, 200, 0), ...] CHARACTER STRING: X PREFECTURE |
| | 4 | FREE FORMAT | KEYWORD EXTRACTION | CHARACTER STRING: BILL/ORDER SHEET/CONTRACT |
| C | 1 | APPLICATION FORM C | LIMITED AREA OCR | COORDINATES: (20, 0), (120, 20) ... |
| | .. | ... | ... | ... |
| D | 1 | APPLICATION FORM D | BACKGROUND COLOR ELIMINATION+ LIMITED AREA OCR | COORDINATES: (300, 0), (400, 20) CHARACTER STRING: APPLICATION FORM D |
| | .. | ... | ... | ... |

(56) References Cited

U.S. PATENT DOCUMENTS

2014/0307959 A1* 10/2014 Filimonova ........ G06K 9/00449
                                                      382/159
2014/0324648 A1* 10/2014 Mori .................... G06Q 40/123
                                                      705/31
2016/0307067 A1* 10/2016 Filimonova .......... G06K 9/6202
2016/0350293 A1* 12/2016 Gates ................ G06F 17/30011

* cited by examiner

FIG. 1
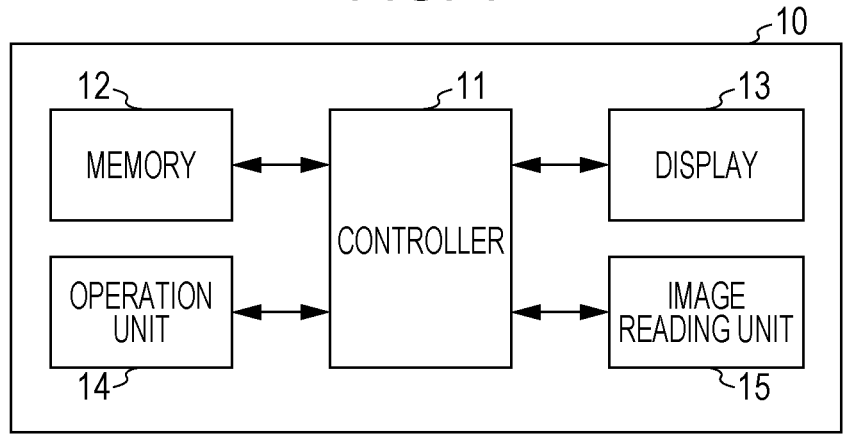
FIG. 2
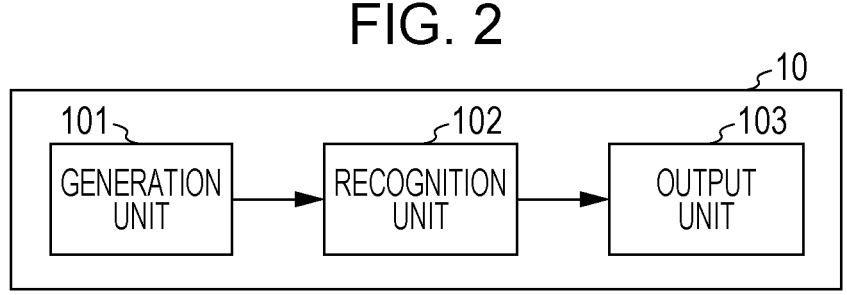
FIG. 3

FIG. 4
| V PREFECTURE W CITY | CERTIFICATE OF RESIDENCE | | |
|---|---|---|---|
| NAME | DATE OF BIRTH | SEX | DATE OF BECOMING RESIDENT |
| | | | |
| ADDRESS | DATE YOUR ADDRESS WAS FIXED | | DATE OF NOTIFICATION |
| | | | |
| HOUSEHOLDER | FAMILY RELATIONSHIP | | DATE OF BECOMING RESIDENT |
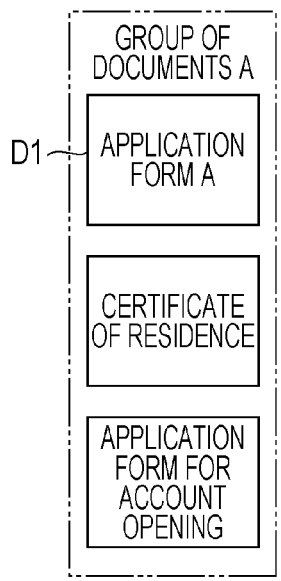
FIG. 5A
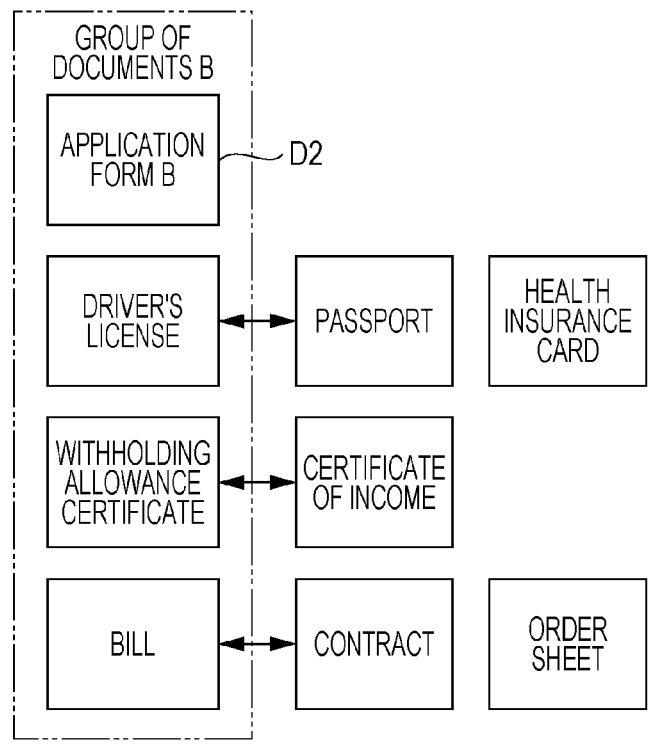
FIG. 5B

FIG. 7

| GROUP OF DOCUMENTS | ORDER | TYPE OF DOCUMENT | IMAGE RECOGNITION METHOD | RECOGNITION-USE INFORMATION |
|---|---|---|---|---|
| A | 1 | APPLICATION FORM A | QR CODE RECOGNITION | CODE INFORMATION: 0001 |
| A | 2 | CERTIFICATE OF RESIDENCE | LIMITED AREA OCR | COORDINATES: (100, 2), (200, 18) CHARACTER STRING: CERTIFICATE OF RESIDENCE |
| A | 3 | APPLICATION FORM FOR ACCOUNT OPENING | QR CODE RECOGNITION | CODE INFORMATION: 0001 |
| B | 1 | APPLICATION FORM B | QR CODE RECOGNITION | CODE INFORMATION: 0002 |
| B | 2 | DRIVER'S LICENSE | LIMITED AREA OCR | COORDINATES: (50, 20), (60, 40) CHARACTER STRING: DRIVER'S LICENSE |
| B | 2 | HEALTH INSURANCE CARD | BACKGROUND COLOR ELIMINATION * LIMITED AREA OCR | COORDINATES: (5, 5), (15, 10) CHARACTER STRING: HEALTH INSURANCE CARD |
| B | 3 | CERTIFICATE OF RESIDENCE OF X PREFECTURE | LIMITED AREA OCR | COORDINATES: (100, 2), (200, 18) CHARACTER STRING: CERTIFICATE OF RESIDENCE |
| B | 3 | CERTIFICATE OF RESIDENCE OF X PREFECTURE | RULED LINE RECOGNITION/ KEYWORD EXTRACTION | RULED LINE CHARACTERISTICS: [(0, 0, 200, 0), ...] CHARACTER STRING: X PREFECTURE |
| B | 4 | FREE FORMAT | KEYWORD EXTRACTION | CHARACTER STRING: BILL/ORDER SHEET/CONTRACT |
| C | 1 | APPLICATION FORM C | LIMITED AREA OCR | COORDINATES: (20, 0), (120, 20) ... |
| C | .. | ... | ... | ... |
| D | 1 | APPLICATION FORM D | BACKGROUND COLOR ELIMINATION * LIMITED AREA OCR | COORDINATES: (300, 0), (400, 20) CHARACTER STRING: APPLICATION FORM D |
| D | .. | ... | ... | ... |

FIG. 8

| GROUP OF DOCUMENTS | ORDER | TYPE OF DOCUMENT | SUCCESS OR FAILURE OF RECOGNITION |
|---|---|---|---|
| B | 1 | APPLICATION FORM B | SUCCESS |
| | 2 | DRIVER'S LICENSE | SUCCESS |
| | | HEALTH INSURANCE CARD | NOT YET BEEN PERFORMED |
| | 3 | CERTIFICATE OF RESIDENCE OF X PREFECTURE | FAILURE |
| | | | SUCCESS |
| | 4 | FREE FORMAT | SUCCESS |

FIG. 9A

IMAGE RECOGNITION IS COMPLETED

| TYPE OF APPLICATION | APPLICATION B |
|---|---|
| MISSING DOCUMENT | NONE |

FIG. 9B

IMAGE RECOGNITION IS COMPLETED

| TYPE OF APPLICATION | APPLICATION B |
|---|---|
| MISSING DOCUMENT | DRIVER'S LICENSE OR HEALTH INSURANCE CARD |

FIG. 13

| GROUP OF DOCUMENTS | ORDER | TYPE OF DOCUMENT | PAGE | IMAGE RECOGNITION METHOD | RECOGNITION-USE INFORMATION |
|---|---|---|---|---|---|
| E | 1 | APPLICATION FORM B | 1 | XXX | XXX |
| | 2 | CERTIFICATE | 1 | XXX | XXX |
| | | | 2 | XXX | XXX |
| | | | 3 | XXX | XXX |

FIG. 14

| GROUP OF DOCUMENTS | ORDER | TYPE OF DOCUMENT | IMAGE RECOGNITION METHOD | RECOGNITION-USE INFORMATION |
|---|---|---|---|---|
| E | 1 | APPLICATION FORM E | α | XXX |
| | 2 | CERTIFICATE | β | XXX |
| | 3 | CONTRACT | γ | XXX |
| | 4 | WITHHOLDING ALLOWANCE CERTIFICATE | Δ | XXX |

FIG. 18A
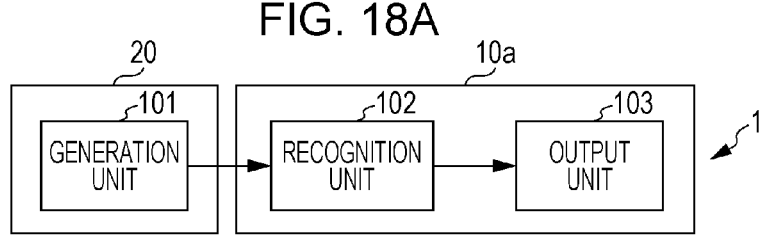
FIG. 18B
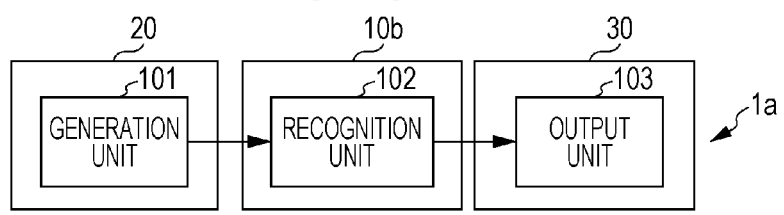
FIG. 19
| GROUP OF DOCUMENTS | ORDER | TYPE OF DOCUMENT | PAGE | IMAGE RECOGNITION METHOD | RECOGNITION-USE INFORMATION |
|---|---|---|---|---|---|
| F | 1 | APPLICATION FORM F | 1 | ε | XXX |
| | | | 2 | ζ | XXX |
| | | | 3 | η | XXX |
| | 2 | DRIVER'S LICENSE | 1 | κ | XXX |

FIG. 20A
FIG. 20B
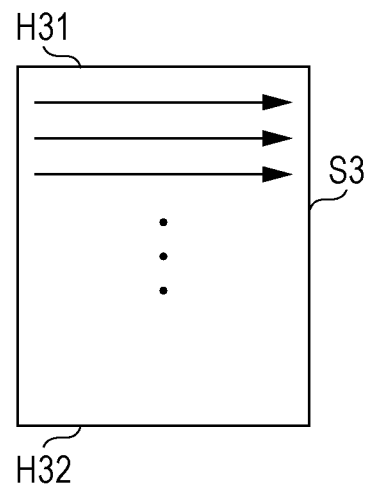
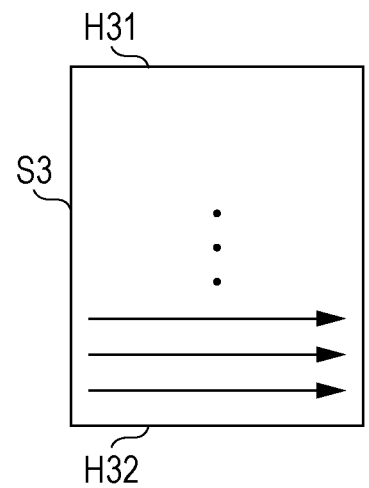
FIG. 21
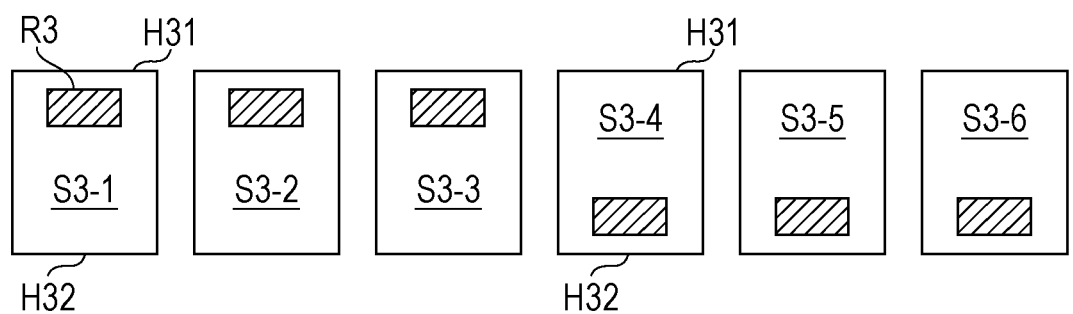

INFORMATION PROCESSING APPARATUS, SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-004930 filed Jan. 14, 2015.

BACKGROUND

Technical Field

The present invention relates to an information processing apparatus, a system, and a non-transitory computer readable medium.

SUMMARY

According to an aspect of the invention, there is provided an information processing apparatus including a recognition unit. The recognition unit has image recognition methods of plural types, the recognition unit recognizing, in a case where image data of a first document and image data of a second document are generated by a generation unit that reads a document and generates image data of the document, the type of the first document from the image data of the first document and recognizing the type of the second document from the image data of the second document using an image recognition method corresponding to the type of the first document among the image recognition methods of the plural types, the first document and the second document being included in plural documents.

BRIEF DESCRIPTION OF THE DRAWINGS

An exemplary embodiment of the present invention will be described in detail based on the following figures, wherein:

FIG. 1 is a diagram illustrating a hardware configuration of an information processing apparatus;

FIG. 2 is a diagram illustrating a functional configuration for realizing the information processing apparatus;

FIG. 3 is a diagram illustrating an example of an image of a document to be subjected to QR code recognition;

FIG. 4 is a diagram illustrating an example of an image of a document to be subjected to limited area OCR;

FIGS. 5A and 5B are diagrams illustrating examples of a group of documents necessary for an application;

FIG. 7 is a diagram illustrating an example of a definition table;

FIG. 8 is a diagram illustrating an example of recognition results indicated by result data;

FIGS. 9A and 9B are diagrams illustrating examples of information indicating the degree of completeness of an application document;

FIG. 13 is a diagram illustrating an example of a definition table in a modification;

FIG. 14 is a diagram illustrating another example of a definition table in the modification

FIGS. 18A and 18B are diagrams illustrating examples of a functional configuration realized in the modification;

FIG. 19 is a diagram illustrating an example of a definition table used in the modification;

FIGS. 20A and 20B are diagrams illustrating examples of a manner in which image recognition is performed on an image of a document;

FIG. 21 is a diagram illustrating an example of images of plural documents; and

DETAILED DESCRIPTION

[1] Exemplary Embodiment

Figure 6:
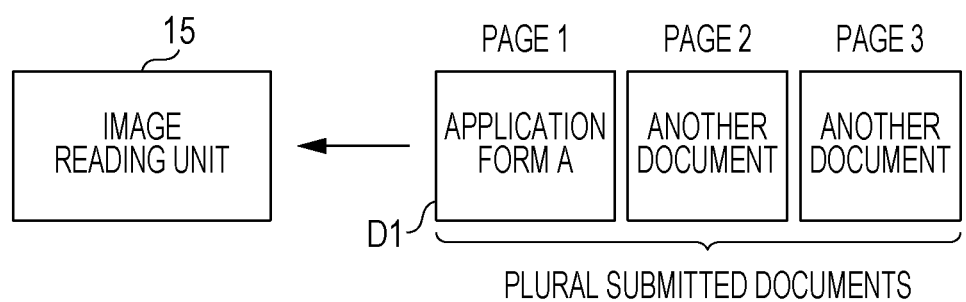
FIG. 6 is a diagram illustrating an example of the order in which plural documents are read.

For example, in an application receiving operation performed in government offices, companies, and the like, an application is not accepted unless a group of documents necessary for the application is complete. Thus, a person on duty who has received submitted documents confirms, for the submitted documents, whether or not the group of documents necessary for the application is complete. In the present exemplary embodiment, an information processing apparatus will be described that supports an operation for confirming plural documents submitted as a group of predetermined documents necessary for a certain application.

FIG. 1 illustrates a hardware configuration of an information processing apparatus 10. The information processing apparatus 10 is a computer including a controller 11, a memory 12, a display 13, an operation unit 14, and an image reading unit 15. The controller 11 includes a central processing unit (CPU), a random-access memory (RAM), and a read-only memory (ROM). The controller 11 controls operations of various units by executing a program stored in the ROM or the memory 12 using the CPU.

The memory 12 is a non-volatile memory and stores various programs and data. The display 13 includes a display device that displays various messages and images. The operation unit 14 includes an operator and the like for operating the information processing apparatus 10. The image reading unit 15 is, for example, a scanner, and optically reads a sheet such as a paper sheet and supplies image data representing the read sheet to the controller 11. The image reading unit 15 includes a unit that successively sends out plural sheets set in a tray to a position where image reading is performed, and successively reads sheets sent one by one by this unit. In the present exemplary embodiment, the image reading unit 15 successively sends out plural sheets from the top sheet in the case where the tray is at the bottom of the sheets (from the sheet farthest from the tray).

The information processing apparatus 10 realizes functions illustrated in FIG. 2 by executing a program stored in the memory 12 using the controller 11.

FIG. 2 illustrates a functional configuration realized by the information processing apparatus 10. The information processing apparatus 10 includes a generation unit 101, a recognition unit 102, and an output unit 103. The generation unit 101 is a unit that reads a document and generates image data representing the document. Upon successively reading sheets of plural documents one by one, the generation unit 101 supplies generated image data representing the plural documents to the recognition unit 102. The data may be plural pieces of image data representing respective documents or may also be a piece of image data of an image representing the plural documents.

In the case where image data are generated by the generation unit 101, the recognition unit 102 is a unit that recognizes the type of document indicated by an image represented by the image data. The recognition unit 102 recognizes the type of document with any one of plural methods described below or a combination of some or all of the plural methods. Specifically, five image recognition methods are used, which are Quick Response (QR) Code® recognition, limited area optical character recognition (OCR), ruled line recognition, keyword extraction, and background color elimination.

QR code recognition is a method for recognizing, in the case where a QR code is illustrated in an image of a document, the type of the document in accordance with information coded in the QR code (hereinafter referred to as "code information"). A QR code is recognizable no matter where it is illustrated in an image, and thus in the case where a QR code is illustrated, an image of any type of document is to be subjected to QR code recognition regardless of the type of document.

FIG. 3 illustrates an example of an image of a document to be subjected to QR code recognition. In FIG. 3, an image S1 of a document is illustrated the type of which is "application form A". A QR code Q1 is formed at the upper right of the image S1. This "application form A" is associated with, for example, code information "0001". The recognition unit 102 reads the code information of the QR code Q1. In the case where the read code information is "0001", the type "application form A" corresponding to this code information is recognized as the type of the document indicated by the image S1.

Limited area OCR is a method for recognizing the type of a document in accordance with a result obtained by performing so-called OCR processing on a specified area of an image of the document in a limited manner. In so-called OCR processing, shapes of characters within an image are recognized and a code of a corresponding character string is obtained. When the entirety of a document is subjected to OCR processing, the character recognition rate decreases unless images of ruled lines and the like other than characters are eliminated. However, for an image of a document, in the case where an area presenting a character string is predetermined and where the position and size of the area is known, compared with the case where OCR processing is performed on the entirety of the document, the character recognition rate may be improved by using the limited area OCR. Thus, in this case, the image of the document is to be subjected to the limited area OCR.

FIG. 4 illustrates an example of an image of a document to be subjected to the limited area OCR. In FIG. 4, an image S2 of a document is illustrated the type of which is "certificate of residence". In an area R1 of the image S2, a character string T1, "certificate of residence", simply representing the type of the document is illustrated. Needless to say, the character string T1 is associated with the type of document "certificate of residence". The area R1 is defined by using a point P1 located at the coordinates (100, 2) and a point P2 located at the coordinates (200, 18), using the coordinates of an xy-coordinate system having the upper left of the image of the document as the origin point. The x coordinate of the area R1 is from 100 to 200 inclusive and the y coordinate of the area R1 is from 2 to 18 inclusive. The recognition unit 102 performs OCR processing only on the area R1 in accordance with these coordinates and obtains a code of the character string T1. The recognition unit 102 recognizes the type "certificate of residence" associated with the character string T1 represented by this code, as the type of the document indicated by the image S2.

Ruled line recognition is a method for recognizing the type of a document from the shape of a table illustrated in the document. The recognition unit 102 retains an image of a table used in a document and determines whether or not the image of the table is included in an image of a read document by performing pattern matching processing. When the image of the table is included, the recognition unit 102 recognizes the read document as the type of document corresponding to the image of the table. Ruled line recognition is used for targets that are images of ready-made documents in which QR codes are unable to be embedded and images of documents whose character strings characterizing the documents are small in size.

Keyword extraction is a method for recognizing the type of a document by reading a character string characterizing the document. Examples of the character string are "order sheet", "bill", "estimate", and the like. These character strings are not suitable for the limited area OCR since the location of such a character string varies in an image of a document, depending on who has made the document (a company, a section, a person in charge, or the like). These character strings are relatively larger than other characters. In the case of a horizontally written document, such a character string often has characteristics such that the character string is illustrated in the center in the lateral direction (a with-stream character orientation) and in an upper side, in the up-and-down direction, of the document. In the case where such a character string is recognized, when the size and arrangement of the read document match those of the type of document indicated by the character string, the recognition unit 102 recognizes the document as the type of document having such characteristics. Keyword extraction is realized using, for example, the technology disclosed in Japanese Unexamined Patent Application Publication No. 2012-190313.

Background color elimination is a method for eliminating an image such as a pattern illustrated as the background of a document. In the case where a background is illustrated, the background interferes with characters and ruled lines. Thus, compared with the case where the background is plain, the recognition rates of OCR processing and ruled line recognition decrease. By performing background color elimination, these recognition rates may be improved.

The recognition unit 102 performs image recognition when plural documents are submitted as a group of documents necessary for an application.

FIGS. 5A and 5B illustrate examples of a group of documents necessary for an application. FIG. 5A illustrates a group of documents A including an "application form A", a "certificate of residence", and an "application form for account opening" necessary for an application A. FIG. 5B illustrates a group of documents B including an "application form B", a "driver's license", a "withholding allowance certificate", and a "bill" necessary for an application B. For the documents included in the group of documents B, a "passport" or a "health insurance card" may be used instead of the "driver's license", and a "certificate of income" may be used instead of the "withholding allowance certificate". In addition, a "contract" or an "order sheet" may be used instead of the "bill".

Each group of documents includes a document representing the group of documents (hereinafter referred to as a "representative document"). A representative document is a document that is always included in a certain group of documents but not included in other groups of documents. For example, the "application form A" is a representative document D1 of the group of documents A, and the "application form B" is a representative document D2 of the group of documents B. For example, when plural documents, which have been submitted, include the representative document D1, it is clear that the plural documents are submitted as the group of documents A.

Note that there may be the case where a one-page document is used as a representative document for plural applications individually. For example, a one-page document may be used both for an application for new registration and for an application for renewing registration. In that case, for example, there is a description indicating the type of application for which such a one-page document is to be used. An example of the description is checkboxes of "new" and "renew", in either one of which a checkmark is placed. Thus, although the printed form of a document is common to plural applications, the document that has been filled in by an applicant may be a document that is not included in the other groups of documents, that is, a representative document.

In the present exemplary embodiment, an applicant is supposed to submit plural documents stacked in a specified order. For example, in the case of the group of documents A illustrated in FIG. 5A, the specified order is as follows: No. 1, the application form A, which is the representative document D1; No. 2, the certificate of residence; and No. 3, the application form for account opening. In the case of the group of documents B, the specified order is as follows: No. 1, the application form B, which is the representative document D2; No. 2, the driver's license; No. 3, the withholding allowance certificate; and No. 4, the bill (the second to fourth documents may also be alternative documents). This order is described in the representative document or on a sheet posted at the place where the representative document is filled in. An applicant stacks plural documents in the specified order by referring to such a description.

The person on duty who has received these documents sets these documents, which are plural documents stacked in this specified order, in a tray of the image reading unit 15 such that its representative document is read first (in the case where sheet feeding is performed from the topmost sheet, the plural documents are placed such that the No. 1 document comes on the top thereof). The order in which the plural documents are read by setting the documents in this manner will be described with reference to FIG. 6.

FIG. 6 illustrates an example of the order in which plural documents are read. In FIG. 6, three documents are submitted, and the way is illustrated in which a No. 1 document and No. 2 and No. 3 documents are read successively by the image reading unit 15. The No. 1 document is the representative document D1, and the No. 2 and No. 3 documents are other documents.

When reading of the plural documents set as described above is started, the generation unit 101 generates image data representing the plural documents that have been set, that is, each of the plural documents submitted as a group of documents necessary for an application. The plural documents submitted in this manner as the group of documents necessary for the application include a first document and a second document. In the case where image data representing the first document and image data representing the second document are generated by the generation unit 101, first, the recognition unit 102 recognizes the type of the first document from the image of the first document, and then recognizes the type of the second document from the image of the second document.

In the present exemplary embodiment, the recognition unit 102 treats the document read first (page 1) by the generation unit 101 as the first document and treats the document of pages 2 to the end, which has been read, other than the first document as second documents. The recognition unit 102 has image recognition methods of plural types including the above-described QR code recognition, and recognizes the types of these documents using the plural image recognition methods. The recognition unit 102 uses a definition table in which each type of document is associated with an image recognition method that should be used for the type of document.

FIG. 7 illustrates an example of the definition table. In this definition table, for each group of documents (A, B, C, D, . . . ), image recognition methods corresponding to the types of documents included in the group of documents are defined. For each of the types of the documents, the order is specified such as "1", "2", . . . . For example, in the case of the group of documents A, the order of the types of the documents is specified as follows: No. 1, which is "1", "application form A"; No. 2, which is "2", "certificate of residence"; and No. 3, which is "3", "application form for account opening".

The No. 1 document type, "application form A", is associated with an image recognition method called "QR code recognition" and "code information: 0001" serving as recognition-use information. Recognition-use information is information used to recognize the type of document. This code information is used such that, in the case where the code information represented by a QR code is "0001", the type of a document having the QR code is recognized as "application form A". As a result of document type recognition performed by the recognition unit 102 using this image recognition method, in the case where the type of document corresponding to the image recognition method is recognized (in this case, the type of document is "application form A"), it is determined that recognition using this image recognition method has been successful. In contrast, in the case where the type of document corresponding to the image recognition method is not recognized, it is determined that recognition using this image recognition method has failed.

The No. 2 document type, "certificate of residence", is associated with an image recognition method called "limited area OCR", and "coordinates: (100, 2), (200, 18)" and "character string: certificate of residence" serving as recognition-use information. This recognition-use information is used such that, in the case where a character string read by using OCR processing from an area defined by the coordinates in an image of a certain document is "certificate of residence", the type of this document is recognized as "certificate of residence". For the group of documents A, definitions are made for the No. 1 document type to the No. 3 document type, which is "application form for account opening". For the group of documents B, definitions are made for the No. 1 document type to the No. 4 document type. In addition, the No. 1 document type of each group of documents is a representative document.

The recognition unit 102 tries whether the type of the first document is recognized from an image of the first document by using plural image recognition methods in a certain order. The recognition unit 102 uses, as the plural image recognition methods, plural image recognition methods associated with the No. 1 document types of the above-described groups of documents in the definition table. That is, each of the plural image recognition methods used by the recognition unit 102 is a method corresponding to one of the No. 1 document types. In the example of FIG. 7, the recognition unit 102 tries to recognize the types of the first documents in the order of "application form A", "application form B", "application form C", and "application form D" using the image recognition methods associated with these types of document.

In the present exemplary embodiment, by use of the definition table illustrated in FIG. 7, the QR code recognition associated with "application form A" and "application form B" is used before the other image recognition methods are used. In this manner, the recognition unit 102 tries to recognize the types of the first documents by using a method for recognizing an image obtained by converting information into a code such as a QR code (hereinafter referred to as a "code image") before the other image recognition methods are used.

When the recognition unit 102 tries to recognize the types of the first documents using the image recognition methods, some cases of recognition may be successful and some cases of recognition may be unsuccessful. For example, in the case where code information read using the QR code recognition is "0002", recognition of "application form A" fails; however, recognition of the next "application form B" is successful. In addition, in the case where both of recognition of "application form A" and recognition of "application form B" have failed in the QR code recognition, the recognition unit 102 tries to perform recognition using the limited area OCR corresponding to "application form C". In the case where recognition of the type of document still fails, the recognition unit 102 tries to perform recognition using the background color elimination and the limited area OCR corresponding to "application form D". In this manner, when the recognition unit 102 tries to recognize the type of a first document among the first documents, the recognition unit 102 changes one image recognition method to another and tries recognition until the type of the first document is successfully recognized.

The recognition unit 102 recognizes, as the type of a first document, the type corresponding to the method by using which recognition of the type of the first document has been successful from the image of the first document, the method being included in the above-described plural image recognition methods. For example, in the case where recognition of the type of the first document has been successful with an image recognition method corresponding to "application form B" (the QR code recognition using the code information "0002"), the recognition unit 102 recognizes "application form B" corresponding to this image recognition method as the type of the first document.

When the recognition unit 102 recognizes the type of the first document, the recognition unit 102 uses image recognition methods defined as the image recognition methods for the group of documents including the type of the recognized first document to recognize the types of the subsequent documents. That is, the recognition unit 102 recognizes the type of a second document from an image of the second document using the image recognition method corresponding to the type of the recognized first document among the image recognition methods of plural types. For example, in the case where "application form B" is recognized as the type of the first document, the recognition unit 102 uses the definitions associated with the group of documents B to recognize the types of the subsequent documents. Specifically, the recognition unit 102 tries to recognize the type of a second document using an image recognition method corresponding to a No. 2 document type "driver's license". Then, the recognition unit 102 may try to recognize the type of the second document using an image recognition method corresponding to a No. 3 document type "certificate of residence of X prefecture".

Upon failing recognition of the type of the second document using the image recognition method corresponding to "driver's license", the recognition unit 102 tries recognition using an image recognition method corresponding to another No. 2 document type "health insurance card". In the case where this recognition also fails, the recognition unit 102 tries recognition using an image recognition method corresponding to the No. 3 document type "certificate of residence of X prefecture". Since there are two image recognition methods corresponding to "certificate of residence of X prefecture", first, the recognition unit 102 tries recognition using, for example, the first method "limited area OCR". In the case where this recognition fails, the recognition unit 102 tries recognition using the second method "ruled line recognition/keyword extraction". In this case, when recognition of the type of a document is successful using either one of the two methods, "certificate of residence of X prefecture" is recognized as the type of the document.

When the submitted documents are incomplete, for example, neither "driver's license" nor "health insurance card" may be recognized as the type of the No. 2 document. Even when recognition of the type of the second document fails as in this case, the recognition unit 102 tries recognition of another second document in succession. This is because a failure in recognition is important information and whether recognition of the other second document is successful or not is also important information. After trying to recognize the type of the last second document in this manner, the recognition unit 102 supplies result data indicating these recognition results to the output unit 103.

FIG. 8 illustrates an example of recognition results indicated by the result data. The result data indicate, for each of the types of the documents included in the group of documents B, whether recognition has been "successful", has "failed", or has "not yet been performed". In this example, since recognition of a "driver's license" has been successful as the type of the No. 2 document, recognition of a "health insurance card" is not performed, that is, "not yet been performed" is illustrated for "health insurance card".

The output unit 103 is a unit that outputs information indicating the degree of completeness of an application document (plural documents submitted for an application) in accordance with recognition results obtained by the recognition unit 102. When result data are supplied from the recognition unit 102, the output unit 103 outputs information indicating the degree of completeness of an application document in accordance with the result data.

FIGS. 9A and 9B illustrate examples of the information indicating the degree of completeness of an application document. In FIG. 9A, information indicating a character string "image recognition is completed", information indicating that the type of application is "application B", and information indicating no missing document are displayed on the display 13 as the information indicating the degree of completeness of an application document. For the types of documents indicated by the result data and associated with the ranks in the order for the group of documents (the No. 1 to No. 4 document types in the example of FIG. 8), when recognition of at least one or more types of document have been successful for each of the ranks, the output unit 103 outputs information indicating that there is no type of document that is missing.

FIG. 9B differs from the example of FIG. 9A. In FIG. 9B, information indicating that there is a type of document that is missing is displayed on the display 13 as information indicating the degree of completeness of an application document. In FIG. 9B, as the type of document that is missing, the type of document "driver's license or health insurance card" is illustrated. For the documents indicated by the result data and associated with the ranks in the order for the group of documents, when there is a rank in the order at which recognition of the type or types of document has not been successful at all, the output unit 103 outputs information indicating the type or types of document corresponding to the rank in the order. In the example of FIG. 9B, since recognition of the type of a document has failed for both of the No. 2 document types, "driver's license" and "health insurance card", these two types of document are displayed.

The information processing apparatus 10 performs a recognition process for recognizing the type of a document from an image of the document using the above-described configuration. The procedure of operations performed by the information processing apparatus 10 in the recognition process will be described with reference to FIG. 10 and FIG. 11.

Figure 10:
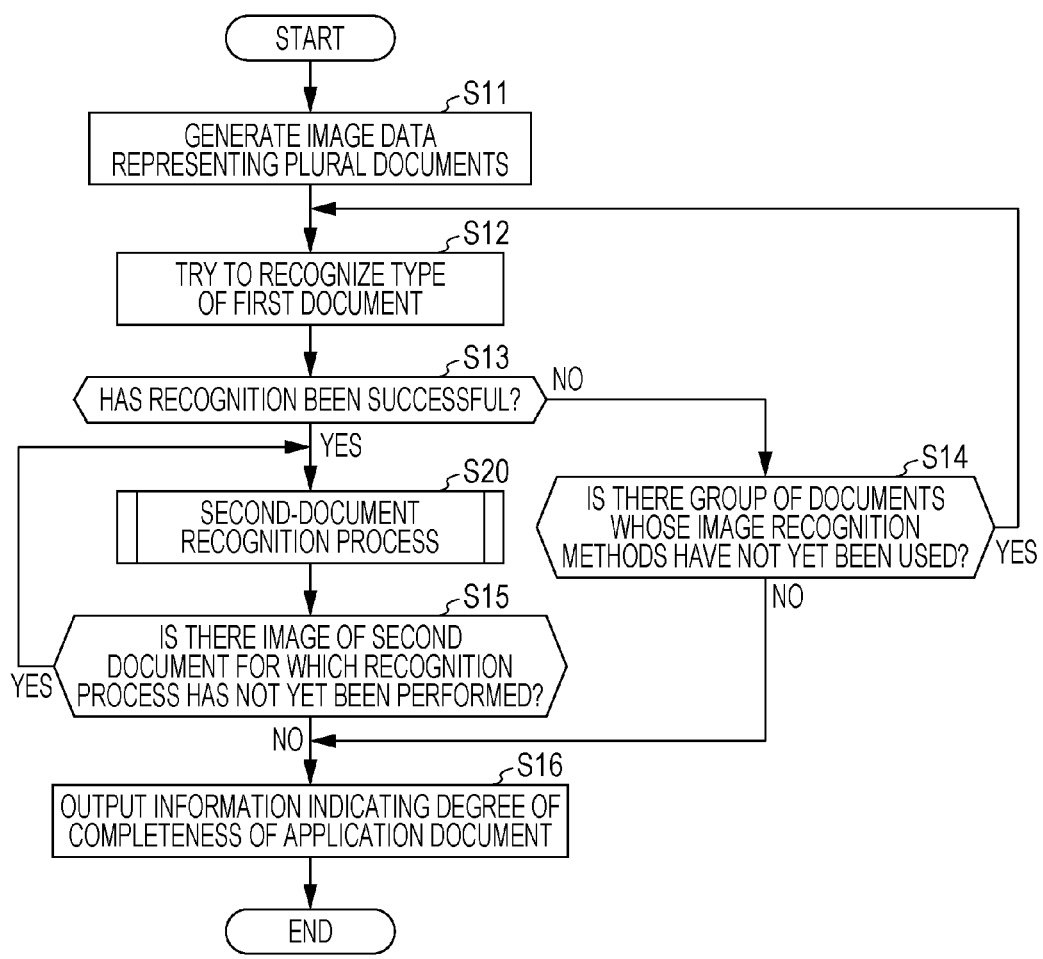
FIG. 10 is a diagram illustrating an example of the procedure of operations in a recognition process.

FIG. 10 illustrates an example of the procedure of operations in the recognition process. The person on duty performs an operation for causing the information processing apparatus 10 to read plural documents submitted by an applicant, triggering the start of the recognition process. First, upon reading plural images, the information processing apparatus 10 generates image data representing these plural images (step S11).

Next, the information processing apparatus 10 tries whether the type of a first document included in the plural documents is recognized from an image of the first document using a method corresponding to a certain representative document (step S12). The information processing apparatus 10 determines whether or not this recognition of the type of the first document has been successful (step S13). In the case where it is determined that recognition of the type of the first document has been successful (YES in step S13), a second-document recognition process is performed (step S20). The second-document recognition process is a process for trying to recognize the type of a second document from an image of the second document. Next, the information processing apparatus 10 determines whether or not there is an image of a second document for which the recognition process of step S20 has not yet been performed (step S15). In the case where it is determined that there is such an image (YES in step S15), the operation of step S20 is performed again.

In the case where it is determined in step S13 that recognition of the type of the first document has failed (NO in step S13), the information processing apparatus 10 determines whether or not, in recognition performed in step S12, there is a group of documents whose image recognition methods have not yet been used among the plural documents, the image recognition methods being associated with the group of documents (step S14). In the case where it is determined in step S14 that there is such a group of documents (YES in step S14), the information processing apparatus 10 performs the operation of step S12 using the image recognition methods associated with the group of documents. In the case where it is determined in step S15 that there is no such image (NO in step S15), the information processing apparatus 10 outputs information indicating the degree of completeness of the application document (step S16) and completes the recognition process.

Also in the case where it is determined in step S14 that there is no such group of documents (NO in step S14), the information processing apparatus 10 performs the operation of step S16 and completes the recognition process. The information indicating the degree of completeness of the application document in this case is, for example, information indicating that the application document, that is, the plural documents submitted for the application do not include any representative document. The operation of step S11 is performed by the generation unit 101 and the operation of step S16 is performed by the output unit 103. Any of the other operations is performed by the recognition unit 102.

Figure 11:
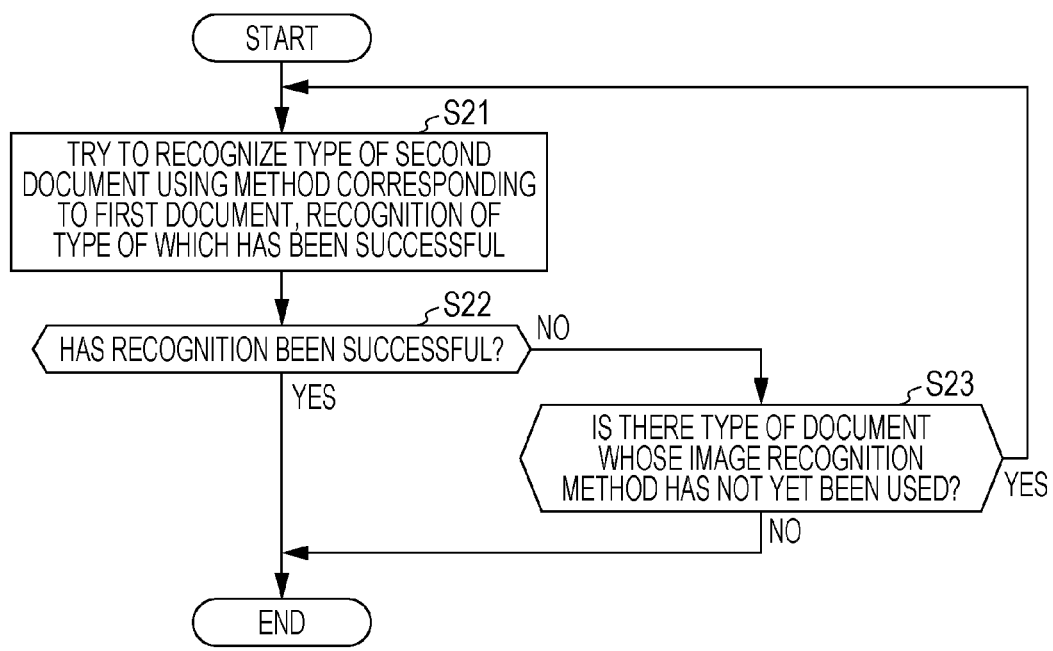
FIG. 11 is a diagram illustrating an example of the procedure of operations in a second-document recognition process.

FIG. 11 illustrates an example of the procedure of operations in the second-document recognition process. First, the information processing apparatus 10 tries to recognize the type of a second document using the method corresponding to the first document, recognition of the type of which has been successful in step S12 (step S21). Next, the information processing apparatus 10 determines whether or not recognition of the type of the second document has been successful in step S21 (step S22). In the case where it is determined that the recognition of the type of the second document has been successful (YES in step S22), the information processing apparatus 10 completes the second-document recognition process. In the case where it is determined in step S22 that the recognition of the type of the second document has failed (NO in step S22), the information processing apparatus 10 determines whether or not a type of document whose image recognition method has not yet been used in recognition performed in step S21 is included in the types of the other documents included in the group of documents including the first document recognition of the type of which has been successful (step S23). In the case where it is determined in step S23 that such a type of document whose image recognition method has not yet been used in recognition performed in step S21 is included (YES in step S23), the information processing apparatus 10 performs the operation of step S21 using the image recognition method corresponding to the type of the document. In the case where it is determined in step S23 that such a type of document whose image recognition method has not yet been used in recognition performed in step S21 is not included (NO in step S23), the information processing apparatus 10 completes the second-document recognition process.

Since the formats of documents included in a group of documents necessary for an application vary and the written content varies, it is difficult to recognize all the types of the documents using, for example, only one image recognition method. Desirably, for the types of the documents, image recognition methods corresponding to the respective types of the documents are used. In the present exemplary embodiment, from images of the first document and the second documents submitted for the application, the type of the first document is recognized and the type of at least one of the second documents is recognized using an image recognition method corresponding to the recognized type of the first document. For example, a document such as the above-described representative document, which is included in a certain group of documents but not included in other groups of documents, is treated as the first document. Consequently, when the type of the first document is recognized, the types of the other documents necessary for the application, that is, second documents are determined and image recognition methods effective for images of the second documents are also determined. Since these methods are used in accordance with the type of the first document, even when a recognition target is a collection of documents of plural types, recognition is performed for each document by applying a document recognition method appropriate for the document.

In addition, in the present exemplary embodiment, the type corresponding to the method by using which recognition of the type of the first document has been successful among the plural image recognition methods is recognized as the type of the first document. As a result, even when a document recognition method appropriate for the type of the first document is unknown, the type of the first document is recognized. For example, which types of application are to be submitted have already been known in a certain application receiving operation. Image recognition methods corresponding to representative documents for all the types of application are prepared as plural image recognition methods. As a result, even when the type of an application is unknown, the type of its first document is recognized. In addition, in the present exemplary embodiment, since information indicating the degree of completeness of an application document, that is, the degree of completeness of plural documents submitted for an application is output, the applicant who has submitted the documents may be informed of whether or not the application document is complete.

[2] Modification

The above-described exemplary embodiment is a mere exemplary embodiment of the present invention, and may also be modified as in the following. In addition, some or all of the above-described exemplary embodiment and various modifications described in the following may be combined as necessary and be executed.

[2-1] Specification of Representative Document

The type of the first document is recognized by using image recognition in the exemplary embodiment; however, the recognition method is not limited to image recognition. For example, the type of the first document may also be recognized by a person performing specification, an example of the person being a person on duty to receive application documents. In this case, for example, the recognition unit 102 displays, on the display 13, an image for specifying the type of application.

Figure 12:
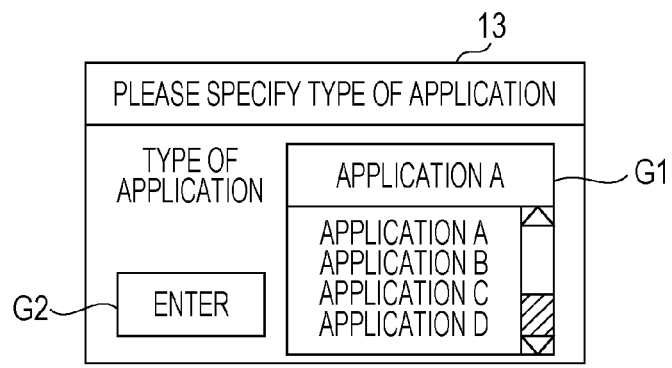
FIG. 12 is a diagram illustrating an example of an image for specifying the type of application.

FIG. 12 illustrates an example of an image for specifying the type of application. In FIG. 12, a character string of "please specify type of application", a display field G1 displaying the type of application being specified, and an operator G2 operated by a user when the user specifies and enters a certain type are displayed on the display 13. As in FIG. 12, "application A" is specified as the type of application by operating the operator G2 when "application A" is displayed in the display field G1. In this case, the recognition unit 102 recognizes "application form A", which corresponds to the representative document of the application A, as the type of the first document.

For example, depending on the state of ruled lines and character strings, the type of document may not be correctly recognized by using image recognition methods such as ruled line recognition and keyword extraction. Thus, even when an "application form D" is included in plural documents submitted as, for example, a group of documents D illustrated in FIG. 7, in the case where a character string of "application form D" is printed in a shifted manner, information is not correctly read by using the limited area OCR. Consequently, the type of a first document of the group of documents D is not recognized. According to the present modification, even in that case, the type of the first document may be recognized by the person on duty specifying the type of the first document, and information is output indicating recognition of the types of second documents and the degree of completeness of the application document.

[2-2] Recognition of Type of Document with Plural Pages

In the exemplary embodiment, each type of document is submitted as a one-page document; however, there may be the case where a document with plural pages is submitted. An example of such a case is the case where a certificate attached to an application form is three pages long. In the case where the number of pages is specified, image recognition methods have only to be associated with respective pages in a definition table.

FIG. 13 illustrates an example of a definition table in the present modification. This definition table is obtained by adding a column of "page" to the definition table illustrated in FIG. 7. In this example, for "certificate", which is a No. 2 document type of a group of documents E, three image recognition methods are associated with respective pages "1" to "3". In this case, in the case where recognition of all the three pages has been successful, the recognition unit 102 recognizes "certificate" as the type of a second document.

In addition, plural documents may include types of document for which the numbers of pages are not specified. For example, in the case where a copy of a contract is attached to an application form, the number of pages of the copy varies depending on the content of the contract attached. In addition, depending on who makes the above-described certificate, the number of pages of the above-described certificate may vary. In this case, the recognition unit 102 performs recognition as in the following. Suppose that plural documents include a document of a first type and a document of a second type, and the order of recognition is specified in which the document of the first type is recognized and then the document of the second type is recognized.

In that case, the recognition unit 102 recognizes the type of a document using a first image recognition method corresponding to the first type and a second image recognition method corresponding to the second type. Then, when recognition of the type of the document is successful using the first image recognition method, the recognition unit 102 recognizes the type of the subsequent document using the first image recognition method and the second image recognition method. When recognition of the type of the document is successful using the second image recognition method, the recognition unit 102 recognizes the type of the subsequent document using the second image recognition method again. Even in the case where the number of pages of a document of the first type is not specified, the document of the first type is recognized for the number of pages by performing recognition in this manner. An example of the definition table used in the case where this recognition is performed is illustrated in FIG. 14.

FIG. 14 is another example of the definition table in the present modification. In this definition table, the types of document "application form E", "certificate", "contract", and "withholding allowance certificate" included in the group of documents E and image recognition methods "α", "β", "γ", and "Δ" corresponding to these types are illustrated. It is specified that documents are recognized in the order of "application form E", "certificate", "contract", and then "withholding allowance certificate". Suppose that the number of pages for "certificate" and the number of pages for "contract" are not specified among these types. First, the recognition unit 102 performs recognition for "application form E", which corresponds to a representative document, by using the method α. The procedure of operations thereafter will be described with reference to FIG. 15.

Figure 15:
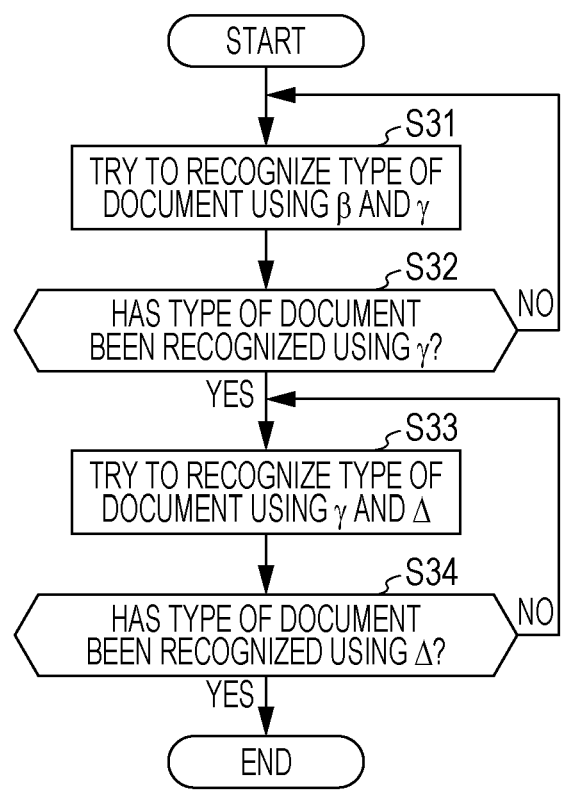
FIG. 15 is a diagram illustrating an example of the procedure of operations in a second-document recognition process in the modification.

FIG. 15 illustrates an example of the procedure of operations performed by an information processing apparatus in a recognition process in the present modification. First, the information processing apparatus 10 tries to recognize the type of a document using the two methods β and γ (step S31). Next, the information processing apparatus 10 determines whether or not the type of the document has been recognized using the method γ (step S32). In the case where it is determined that the type of the document has not been recognized using the method γ (NO in step S32), the process returns to step S31 and the information processing apparatus 10 tries to recognize the type of the subsequent document using the two methods β and γ. In this case, the method β is used as a first image recognition method and the method γ is used as a second image recognition method. In the case where it is determined in step S32 that recognition of the type of the document has been successful using the method γ (YES in step S32), next, the information processing apparatus 10 tries to recognize the type of the subsequent document using the two methods γ and Δ (step S33).

Subsequently, the information processing apparatus 10 determines whether or not the type of the subsequent document has been recognized using the method Δ (step S34). In the case where it is determined that the type of the subsequent document has not been recognized using the method Δ (NO in step S34), the process returns to step S33 and the information processing apparatus 10 tries to recognize, also for the further subsequent document, the type of document using the two methods γ and Δ. In this case, the method γ is used as the first image recognition method and the method Δ is used as the second image recognition method. In the case where it is determined in step S34 that recognition of the type of the subsequent document has been successful using the method Δ (YES in step S34), the information processing apparatus 10 completes the recognition process since the withholding allowance certificate recognized using the method Δ is a one-page document. The operations in steps S31 to S34 are performed by the recognition unit 102.

As described above, the types of document are recognized. Thus, even in the case where a type of a document for which the number of pages is not specified is included in plural documents, the type of the document is recognized for the number of pages of the type of the document. Furthermore, the type of a subsequent document is recognized. Note that both of the documents of the first and second types described above are second documents, that is, the documents obtained by reading pages 2 to the end other than the first document. However, in the case where the number of pages of the first document (that is, a representative document) is not specified, the representative document may be a document of the first type and the document recognized next may be a document of the second type.

[2-3] Undetermined Reading Order

The order of the types of documents in which the generation unit 101 performs reading is specified in the exemplary embodiment; however, the reading order is not limited to this. For example, the case will be described where it is specified that the type of a first document, "application form E", illustrated in FIG. 14 is read first but the reading order is not specified for the types of second document, which are "certificate", "contract", and "withholding allowance certificate".

Figure 16:
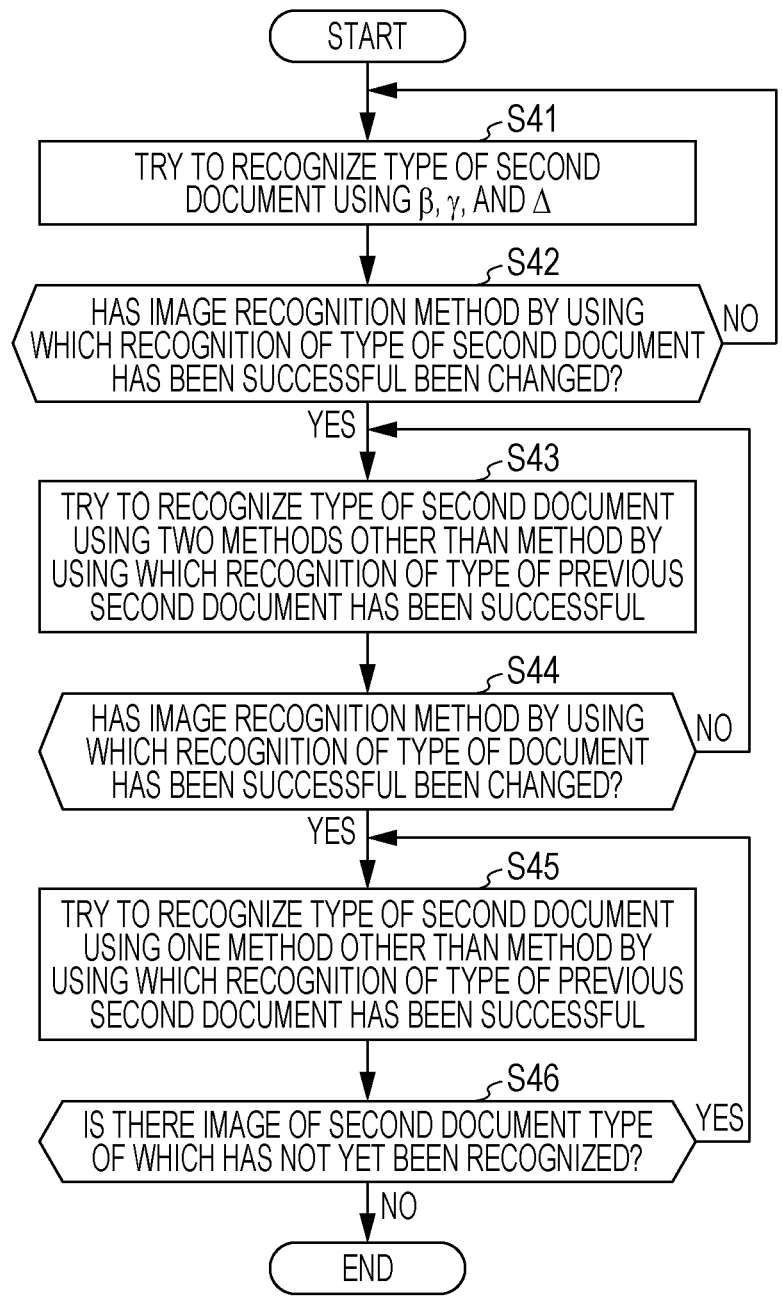
FIG. 16 is a diagram illustrating an example of the procedure of operations in the second-document recognition process in the modification.

FIG. 16 illustrates an example of the procedure of operations in a second-document recognition process in the present modification. First, the information processing apparatus 10 tries to recognize the type of a second document using the three methods β, γ, and Δ (step S41). In this case, no matter in what order the types of second documents are arranged, recognition using either of the methods is successful. Next, the information processing apparatus 10 determines whether or not the image recognition method by using which recognition of the type of the second document has been successful has been changed (step S42). In the case where it is determined that the image recognition method by using which recognition of the type of the second document has been successful has not been changed (NO in step S42), the process returns to step S41 and the operation is performed. As a result, even for certain types of second documents for which the numbers of pages are not specified, such as a certificate and a contract, the operation in step S41 is repeatedly performed until the type of the second document is not recognized.

In the case where it is determined in step S42 that the image recognition method by using which recognition of the type of the second document has been successful has been changed (YES in step S42), the information processing apparatus 10 tries to recognize the type of the subsequent second document using two methods other than the method by using which recognition of the type of the previous second document has been successful (step S43). For example, when recognition of the type of document is successful by first using the method γ, the methods β and Δ are used. Next, the information processing apparatus 10 determines whether or not the image recognition method by using which recognition of the type of document has been successful has been changed (step S44). In the case where it is determined that the image recognition method by using which recognition of the type of document has been successful has not been changed (NO in step S44), the process returns to step S43 and the operation is performed. In the case where it is determined in step S44 that the image recognition method by using which recognition of the type of document has been successful has been changed (YES in step S44), the information processing apparatus 10 tries to recognize the type of the further subsequent second document using one method other than the method by using which recognition of the type of the previous second document has been successful (step S45). Then, the information processing apparatus 10 determines whether or not there is an image of a second document the type of which has not yet been recognized (step S46). In the case where it is determined that there is such an image (YES in step S46), the operation in step S45 is performed. In the case where it is determined that there is no such image (NO in step S46), the information processing apparatus 10 completes the second-document recognition process.

In the present modification, the recognition unit 102 repeatedly tries to recognize the types of second documents using plural image recognition methods corresponding to respective plural second documents. When recognition fails with a method by using which recognition of the type of document has been successful so far, the recognition unit 102 tries to recognize the type of a second document using image recognition methods other than the method. As a result, even in the case where the order in which second documents of plural types are read is not specified, the types of the second documents are recognized.

[2-4] Two-Phase Image Recognition

The recognition unit 102 may perform image recognition in two phases. The recognition unit 102 performs, as a first phase, image recognition for confirming, for example, whether or not an image recognition method is applicable. As a result, in the case where it is confirmed that the image recognition method is applicable, the recognition unit 102 performs, as a second phase, image recognition that has been confirmed as applicable and recognizes the type of a document. As the image recognition for the first phase, image recognition is used that has a smaller processing load than the image recognition for the second phase. As a specific example, for example, in the case of the QR code recognition, image recognition for confirming whether or not there is a QR code on an image of a document is performed as the first phase. When it is confirmed that there is a QR code, it is determined that an image recognition method is applicable. Then, as the second phase, code information represented by the QR code is read and image recognition for recognizing the type of the document is performed.

In addition, in the case of the limited area OCR, image recognition for confirming whether or not a limited area is blank is performed as the first phase. When it is confirmed that the limited area is not blank, it is determined that an image recognition method is applicable. Then, OCR processing is performed on the limited area as the second phase. The recognition unit 102 performs the first-phase image recognition in steps S41 and S43 illustrated in FIG. 16, and tries to recognize the type of a second document using a method determined to be applicable by performing the first-phase image recognition.

[2-5] Top and Bottom Reverse Reading

In the exemplary embodiment, the image reading unit 15 successively sends out sheets of plural documents from the top sheet of the plural documents set in a tray; however, sheets may be successively sent out from the bottom sheet of plural documents set in a tray. In that case, in the case where an applicant stacks a representative document on the top of documents as in the exemplary embodiment, the representative document is read last. In addition, there may also be the case where an applicant stacks a representative document at a wrong position and the representative document is read last. The recognition unit 102 may also perform recognition against such a case.

Specifically, in the case where an image representing a document read first by the generation unit 101 is treated as an image of a first document, when the type of the first document is not recognized from the image of the first document, the recognition unit 102 tries to recognize the type of the first document by treating an image of a document read last by the generation unit 101 as an image of the first document. As a result, even when a representative document is read last as described above, the recognition unit 102 recognizes the type of the first document from the image of the document read last and thereafter, for example, recognizes the type of a second document as in the exemplary embodiment. According to the present modification, even in the case where plural documents are stacked in a wrong order or set in a tray in a wrong manner and a representative document is read last, that is, even in the case where the type of the document read first is recognized last, the type of the first document is recognized.

[2-6] Position of Representative Document

The position of a representative document is on the top of plural documents in the exemplary embodiment and on the top of or at the bottom of plural documents in the above-described modification. However, the position of a representative document may also be somewhere else, that is, may be at a position sandwiched between other documents. Even in that case, for example, as a result of specification of the position of a representative document, the recognition unit 102 performs recognition using, as an image of a first document, an image of a document read in the order corresponding to the specified position. In addition, the recognition unit 102 may also perform an image recognition method for recognizing the type of image of the first document on images of respective documents in a certain order, and may recognize a document for which recognition has been successful as the first document. In that case, the recognition unit 102 performs the second-document recognition process on documents including the documents for which the recognition has failed.

[2-7] Reading of Plural Groups of Documents

In the exemplary embodiment, the types of plural documents are recognized for one application; however, the types of plural documents may also be recognized successively for two or more applications.

Figure 17:
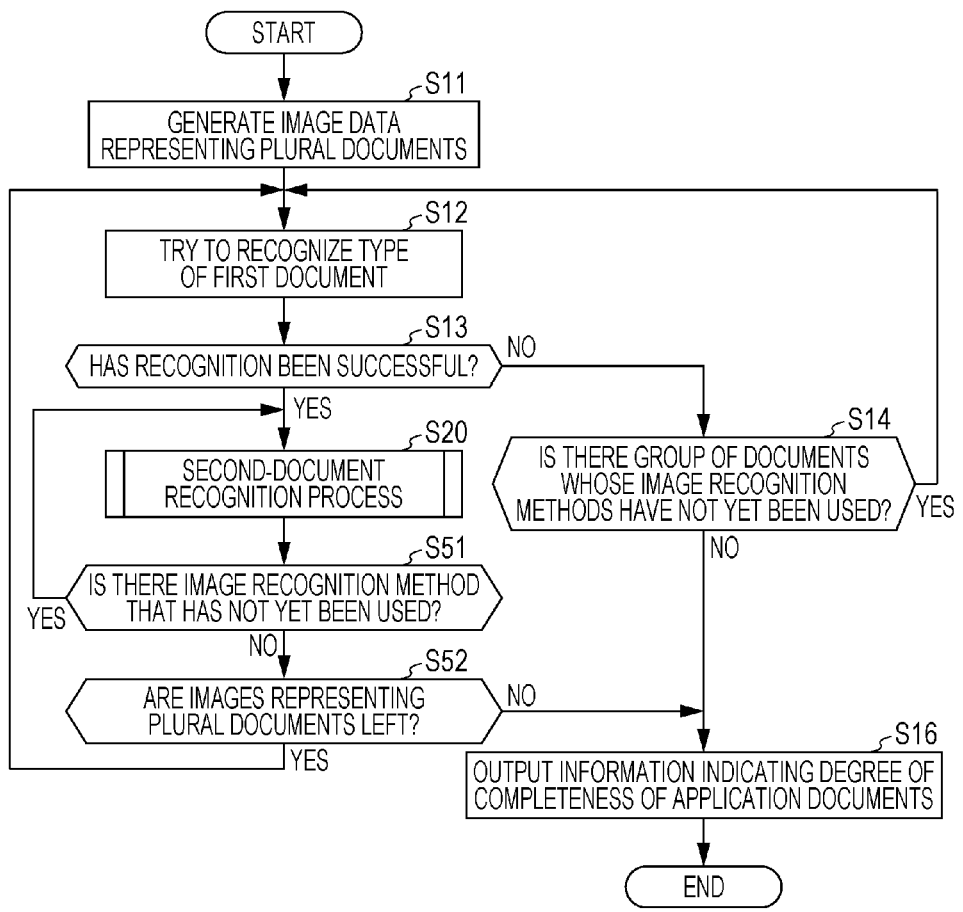
FIG. 17 is a diagram illustrating an example of the procedure of operations in a recognition process in the modification.

FIG. 17 illustrates an example of the procedure of operations in a recognition process in the present modification. In the following, a description will be made using, as an example, the case where images of plural documents submitted as the groups of documents A and B illustrated in FIG. 7 are generated. First, the information processing apparatus 10 performs the same operations as in the example illustrated in FIG. 10 until step S20 (the second-document recognition process). As a result, recognition of the types of documents is performed using the image recognition methods corresponding to "application form A" and "certificate of residence" of the group of documents A.

Next, the information processing apparatus 10 determines whether or not there is an image recognition method that has not yet been used to recognize the type of a second document (step S51). In this example, since the type of a first document is recognized as "application form A", the image recognition methods corresponding to "certificate of residence" and "application form for account opening" are used in this order. After recognition of the type of a document has been performed using the image recognition method corresponding to "certificate of residence" in step S20, since the image recognition method corresponding to "application form for account opening" has not yet been used, the information processing apparatus 10 tries to recognize the type of a second document by performing the operation in step S20 using this method.

As a result, there is no image recognition method that has not yet been used. Next, the information processing apparatus 10 determines whether or not images representing the plural documents are left (step S52). In this example, the plural documents submitted as the group of documents A have been recognized; however, the plural documents submitted as the group of documents B have not yet been recognized. That is, since images representing the plural documents are left, the information processing apparatus 10 determines that images representing the plural documents are left (YES in step S52). The process returns to step S12 (recognition of the type of a first document), and the operation is performed. Thereafter, when recognition of the plural documents submitted as the group of documents B is completed, the information processing apparatus 10 determines in step S52 that images representing the plural documents are not left (NO in step S52), performs the operation in step S16 (output of information indicating the degrees of completeness of application documents), and completes the recognition process. According to the present modification, even when documents for two or more applications are submitted, the type of each document is recognized by reading them in a collective manner.

[2-8] Image Recognition Method

Image recognition methods are not limited to the above-described image recognition methods. For example, bar codes or other two-dimensional code images may also be used instead of QR codes. In addition, both the QR code recognition and the limited area OCR may be used for one type of document, or a combination of three or more image recognition methods may also be used for one type of document. In addition, the type of font of a dictionary used in OCR processing may also be used as recognition-use information.

[2-9] Apparatuses for Realizing Units

The units illustrated in FIG. 2 may be realized by apparatuses different from the apparatus described in the exemplary embodiment.

FIGS. 18A and 18B illustrate examples of a functional configuration realized in the present modification. FIG. 18A illustrates an information processing system 1 including a reading apparatus 20 and an information processing apparatus 10a. The reading apparatus 20 includes the generation unit 101 illustrated in FIG. 2. The information processing apparatus 10a includes the recognition unit 102 and the output unit 103. In this example, even an apparatus that does not include the image reading unit 15 illustrated in FIG. 1 is used as an information processing apparatus.

FIG. 18B illustrates an information processing system 1a including the reading apparatus 20, an information processing apparatus 10b, and an image output apparatus 30. The information processing apparatus 10b includes the recognition unit 102, and the image output apparatus 30 includes the output unit 103. These apparatuses are connected by communication lines, which are not illustrated. In this case, for example, a server apparatus installed at a place (for example, a data center) different from the place where documents are submitted is used as the information processing apparatus 10b. In this example, plural documents are read by the reading apparatus 20 installed at a window for document submission, the information processing apparatus 10b recognizes the types of the documents from images representing the read documents, and result data indicating the result is transmitted to the image output apparatus 30.

The image output apparatus 30 is also installed at the window, and outputs information indicating the degree of completeness of an application document in accordance with the result data. As described above, the units realized by the information processing apparatus 10 described in the exemplary embodiment may also be realized by various apparatuses.

[2-10] Plural Documents

Plural documents are not limited to documents submitted as a group of predetermined documents necessary for a certain application. For example, such plural documents may also be plural documents generated for an operation other than an application receiving operation. In brief, any plural documents may be used when the plural documents are submitted as a group of documents for which a combination of types of document is predetermined. In any of the cases, the recognition unit 102 recognizes the type of each of the submitted plural documents, and the output unit 103 outputs information indicating the degree of completeness of the submitted plural documents in accordance with the results of recognition performed by the recognition unit 102. As a result, the person who has submitted these documents is notified of whether or not the documents are complete.

[2-11] First Document

In the exemplary embodiment, the first document is a one-page document; however, the first document may be a document having two pages or more. In that case, also for a representative document serving as the first document, a definition table is used in which pages of the representative document are associated with respective image recognition methods.

FIG. 19 illustrates an example of a definition table used in the present modification. In this definition table, "application form F", which corresponds to a representative document of a group of documents F, and image recognition methods "ϵ", "ζ", and "η" corresponding to respective pages of the representative document are illustrated. In addition, "driver's license", which is a No. 2 document type, and an image recognition method "κ" corresponding to "driver's license" are also illustrated.

In the case where the recognition unit 102 tries to recognize the type of a first document using the image recognition methods associated with the representative documents, for "application form F", the recognition unit 102 tries to recognize the type of a No. 1 document using "ϵ" associated with a No. 1 document of the first document. When this recognition of the type of the document is successful, the recognition unit 102 subsequently tries to recognize the type of an image of a No. 2 document of the first document using "ζ" associated with the No. 2 document. When this recognition of the type of the image is also successful, the recognition unit 102 tries to recognize the type of an image of a No. 3 document of the first document using "η" associated with the No. 3 document. When these recognition processes are successful, the recognition unit 102 recognizes the type of the first document as "application form F" and tries to recognize the type of an image of a remaining second document using an image recognition method "κ" associated with the remaining second document. In this manner, even when the representative document is a document having two pages or more, recognition is performed in which the document having two pages or more is treated as the first document.

[2-12] Image Recognition Direction

When the recognition unit 102 performs image recognition, the recognition unit 102 divides an image into plural parts, reads sequentially parts of the image, for example, from one side toward the opposite side of the image, and performs an image recognition process on the read parts.

FIGS. 20A and 20B illustrate examples of a manner in which image recognition is performed on an image of a document. FIG. 20A illustrates a manner in which parts of an image S3 of a document are read from a top edge H31 side toward a bottom edge H32 side and an image recognition process is performed. FIG. 20B illustrates a manner in which parts of the image S3 of the document are read from the bottom edge H32 side toward the top edge H31 side and an image recognition process is performed.

For example, in the case where the limited area OCR is performed, when a limited area is located on the top edge H31 side, the parts of the image S3 are read from the top edge H31 side. After parts of the image corresponding to the limited area are read, reading may be stopped. In contrast, when the parts are read from the bottom edge H32 side, almost all the parts of the image are read before the parts of the image corresponding to the limited area are read. Thus, compared with the case where the recognition unit 102 performs the image recognition process from the opposite side, the load of an image recognition process is reduced when the recognition unit 102 performs the image recognition process from the side where the limited area exists. This is true for other image recognition processes. Thus, in the case where an area on which an image recognition process is to be performed is arranged on a certain side, compared with the case where the recognition unit 102 performs the image recognition process from the opposite side, the load of the image recognition process is reduced by the recognition unit 102 performing the image recognition process from the side where the area is arranged.

In addition, the recognition unit 102 may perform image recognition on images of plural documents as in the following.

FIG. 21 illustrates an example of images of plural documents. FIG. 21 illustrates six images S3-1 to S3-6. For any of these images, a limited area R3 is defined on the top side of its document. In FIG. 21, limited areas R3 are diagonally shaded and illustrated. In the case where an applicant stacks the documents so as to match the orientations of the documents, these limited areas R3 are supposed to be arranged on the same side. However, in this example, the documents are stacked such that the top-bottom orientations of the images S3-1 to S3-3 are opposite to the top-bottom orientations of the images S3-4 to S3-6. Thus, the limited areas R3 are arranged on the top edge H31 sides of the images S3-1 to S3-3; however, the limited areas R3 are arranged on the bottom edge H32 sides of the images S3-4 to S3-6.

The recognition unit 102 performs the image recognition process from one side (for example, the top edge H31 side) toward the opposite side (for example, the bottom edge H32 side) of an image of a document, stops the image recognition process after processing for a target area is completed, and performs the image recognition process for an image of the subsequent document. In this case, the recognition unit 102 measures, for the image of each document, the amount of processing of image recognition. In the case where the measured amount of processing becomes greater than or equal to a threshold, the image recognition process is started from the opposite side (in this example, the bottom edge H32 side) for an image of the subsequent documents. As this threshold, for example, the amount of processing obtained when the image recognition process is performed on half or one third of the area of the image of the document is set.

[2-13] Recognition of Information Other than Types of Documents

The recognition unit 102 recognizes the types of documents in the exemplary embodiment; however, information other than the types of documents may also be recognized. For example, the recognition unit 102 recognizes whether or not there is a description in a specified area of a document or recognizes a described character string. For example, when a character string that should be described in the specified area is defined in a definition table, the recognition unit 102 recognizes, using the recognized character string and the definition table, whether or not the character string that should be described is described in the specified area. In these cases, the output unit 103 outputs information indicating the presence or absence of the description in the specified area, as information indicating the degree of completeness of an application document. As a result, even though the types of documents necessary for an application are complete, in the case where the application is unable to be accepted because the documents include an improper description, the applicant is notified of non-acceptance of the application.

[2-14] Process Performed when Recognition Fails

In the exemplary embodiment, even when recognition of the type of a second document fails, the recognition unit 102 subsequently tries to recognize the type of another second document. However, the process performed in such a case is not limited to this. At the time when recognition of the type of a second document fails, second-document recognition may also be terminated. Note that for the case where any one of documents of plural types has only to be submitted (the case where there is an alternative document) as in the case of the No. 2 document of the group of documents B illustrated in FIG. 7 ("driver's license" or "health insurance card"), when all image recognition methods corresponding to these plural respective types of document fail, second-document recognition is terminated.

Figure 22:
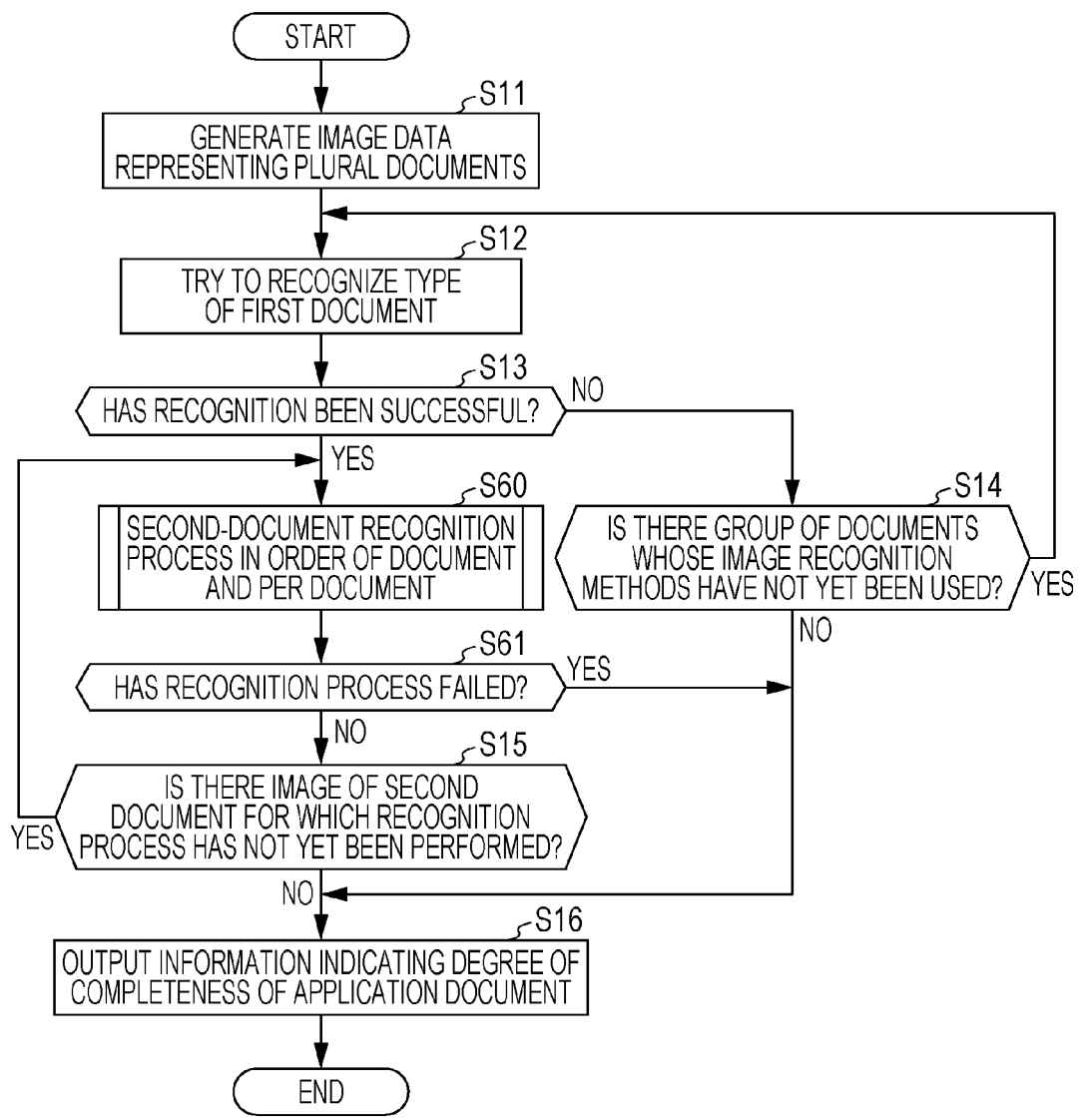
FIG. 22 is a diagram illustrating an example of the procedure of operations in the recognition process in the modification.

FIG. 22 illustrates an example of the procedure of operations in the recognition process in the present modification. In this example, first, step S11 (generation of image data) to step S13 (a determination as to whether recognition is successful) illustrated in FIG. 10 are performed. In the case where the information processing apparatus 10 determines that recognition of the type of the first document has been successful, next, the information processing apparatus 10 performs, as the second-document recognition process, a recognition process for second documents in order of document and per document (step S60). For example, in the case where the information processing apparatus 10 tries to recognize the type of a second document using the method corresponding to "application form B" illustrated in FIG. 7, the information processing apparatus 10 performs recognition for "driver's license", which corresponds to the No. 2 document. When recognition for "driver's license" fails, the information processing apparatus 10 also performs recognition for "health insurance card". That is, in the case where there are alternative documents for a document at a certain rank in the order of document, the information processing apparatus 10 tries to recognize the types of all the documents including the alternative documents until recognition of the type of a document at the certain rank becomes successful.

Next, the information processing apparatus 10 determines whether or not the second-document recognition process has failed (step S61). In the case where it is determined that the second-document recognition process has failed (YES in step S61), the process proceeds to step S16. Then, the information processing apparatus 10 outputs information indicating that an application document is incomplete (alternatively, information indicating that a driver's license or a health insurance card is missing). In addition, in the case where it is determined that the second-document recognition process has been successful (NO in step S61), the information processing apparatus 10 performs step S15 (a determination as to whether there is an image of a second document for which the second-recognition process has not yet been performed). For example, even when recognition of the No. 2 document is successful, the No. 3 document and subsequent documents are left without being subjected to the second-document recognition process. Thus, the process returns to step S60 and the second-document recognition process is performed on the No. 3 document. In this manner, in the present modification, the second-document recognition process is performed on the No. 2 document and subsequent documents in order of document and per document.

[2-15] Category of Exemplary Embodiment of Invention

The exemplary embodiment of the present invention may be perceived as, in addition to the above-described information processing apparatuses, plural apparatuses that realize functions realized by such an information processing apparatus or a system including these apparatuses. In addition, the exemplary embodiment of the present invention may also be perceived as an information processing method for realizing processes performed by the information processing apparatus or a program for causing a computer, which is for example the information processing apparatus, to function as the above-described units. This program may be provided in the form of a recording medium such as an optical disc storing the program or in the form in which the program is downloaded into and installed in a computer via a network such as the Internet and the program becomes usable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to execute:
a recognition unit that has image recognition methods of a plurality of types, the recognition unit recognizing, in a case where image data of a first document and image data of a second document are generated by a generation unit that reads a document and generates image data of the document, the type of the first document from the image data of the first document and recognizing the type of the second document from the image data of the second document using an image recognition method corresponding to the type of the first document among the image recognition methods of the plurality of types, the first document and the second document being included in a plurality of documents
wherein in response to recognition of the type of the first document, the recognition unit tries to recognize the type of the first document by changing the image recognition method to another until recognition of the type of the first document becomes successful,
wherein the generation unit reads sheets of a plurality of documents one by one in a certain order, and
in a case where image data of a document read first is treated as the image data of the first document and where the type of the first document is not recognized from the image data of the first document, the recognition unit tries to recognize the type of the first document by treating image data of a document read last as the image data of the first document.

2. The information processing apparatus according to claim 1, wherein the plurality of documents are submitted as a group of documents for which a combination of types of document is predetermined, the processor being further configured to execute:
an output unit that outputs information indicating a degree of completeness of the plurality of documents, which have been submitted, in accordance with a result of recognition performed by the recognition unit.

3. The information processing apparatus according to claim 2, wherein in the case of recognition of the type of the first document, the recognition unit tries to recognize the type of the first document by changing the image recognition method to another until recognition of the type of the first document becomes successful.

4. An information processing apparatus comprising:
a processor configured to execute:
a recognition unit that has image recognition methods of a plurality of types, the recognition unit recognizing, in a case where image data of a first document and image data of a second document are generated by a generation unit that reads a document and generates image data of the document, the type of the first document from the image data of the first document and recognizing the type of the second document from the image data of the second document using an image recognition method corresponding to the type of the first document among the image recognition methods of the plurality of types, the first document and the second document being included in a plurality of documents, wherein
the plurality of documents include a document of a first type for which a number of pages is not specified and a document of a second type, and
in a case where an order is specified such that the document of the first type is recognized and then the document of the second type is recognized, the recognition unit recognizes the type of a certain document using a first image recognition method corresponding to the first type and a second image recognition method corresponding to the second type, recognizes the type of a subsequent document using the first image recognition method and the second image recognition method in a case where recognition of the type of the certain document has been successful using the first image recognition method, and recognizes the type of the subsequent document using the second image recognition method in a case where recognition of the type of the certain document has been successful using the second image recognition method.

5. The information processing apparatus according to claim 4, wherein
the second document is one of second documents of a plurality of types, and an order in which the plurality of types are read by the generation unit is not specified, and
the recognition unit repeatedly tries to recognize the type of a second document among the second documents using a plurality of image recognition methods corresponding to the respective types of the second documents, and in a case where recognition fails with a method by using which recognition has been successful so far, the recognition unit tries to recognize the type of a second document among the second documents using image recognition methods other than the method.

6. The information processing apparatus according to claim 3, wherein the plurality of documents include a document of a first type for which a number of pages is not specified and a document of a second type, and in a case where an order is specified such that the document of the first type is recognized and then the document of the second type is recognized, the recognition unit recognizes the type of a certain document using a first image recognition method corresponding to the first type and a second image recognition method corresponding to the second type, recognizes the type of a subsequent document using the first image recognition method and the second image recognition method in a case where recognition of the type of the certain document has been successful using the first image recognition method, and recognizes the type of the subsequent document using the second image recognition method in a case where recognition of the type of the certain document has been successful using the second image recognition method.

7. An information processing apparatus comprising:
a processor configured to execute:
a recognition unit that has image recognition methods of a plurality of types, the recognition unit recognizing, in a case where image data of a first document and image data of a second document are generated by a generation unit that reads a document and generates image data of the document, the type of the first document from the image data of the first document and recognizing the type of the second document from the image data of the second document using an image recognition method corresponding to the type of the first document among the image recognition methods of the plurality of types, the first document and the second document being included in a plurality of documents, wherein
the second document is one of second documents of a plurality of types, and an order in which the plurality of types are read by the generation unit is not specified, and
the recognition unit repeatedly tries to recognize the type of a second document among the second documents using a plurality of image recognition methods corresponding to the respective types of the second documents, and in a case where recognition fails with a method by using which recognition has been successful so far, the recognition unit tries to recognize the type of a second document among the second documents using image recognition methods other than the method.

8. The information processing apparatus according to claim 3, wherein
the second document is one of second documents of a plurality of types, and an order in which the plurality of types are read by the generation unit is not specified, and
the recognition unit repeatedly tries to recognize the type of a second document among the second documents using a plurality of image recognition methods corresponding to the respective types of the second documents, and in a case where recognition fails with a method by using which recognition has been successful so far, the recognition unit tries to recognize the type of a second document among the second documents using image recognition methods other than the method.

9. The information processing apparatus according to claim 2, wherein the plurality of documents include a document of a first type for which a number of pages is not specified and a document of a second type, and in a case where an order is specified such that the document of the first type is recognized and then the document of the second type is recognized, the recognition unit recognizes the type of a certain document using a first image recognition method corresponding to the first type and a second image recognition method corresponding to the second type, recognizes the type of a subsequent document using the first image recognition method and the second image recognition method in a case where recognition of the type of the certain document has been successful using the first image recognition method, and recognizes the type of the subsequent document using the second image recognition method in a case where recognition of the type of the certain document has been successful using the second image recognition method.

10. The information processing apparatus according to claim 2, wherein
the second document is one of second documents of a plurality of types, and an order in which the plurality of types are read by the generation unit is not specified, and
the recognition unit repeatedly tries to recognize the type of a second document among the second documents using a plurality of image recognition methods corresponding to the respective types of the second documents, and in a case where recognition fails with a method by using which recognition has been successful so far, the recognition unit tries to recognize the type of a second document among the second documents using image recognition methods other than the method.

11. A system comprising
a processor configured to execute:
a generation unit that reads a document and generates image data of the document; and
a recognition unit that has image recognition methods of a plurality of types, the recognition unit recognizing, in a case where image data of a first document and image data of a second document are generated by the generation unit, the type of the first document from the image data of the first document and recognizing the type of the second document from the image data of the second document using an image recognition method corresponding to the type of the first document among the image recognition methods of the plurality of types, the first document and the second document being included in a plurality of documents,
wherein in the case of recognition of the type of the first document, the recognition unit tries to recognize the type of the first document by changing the image recognition method to another until recognition of the type of the first document becomes successful,
wherein the generation unit reads sheets of a plurality of documents one by one in a certain order, and
in a case where image data of a document read first is treated as the image data of the first document and where the type of the first document is not recognized from the image data of the first document, the recognition unit tries to recognize the type of the first document by treating image data of a document read last as the image data of the first document.

12. A non-transitory computer readable medium storing a program causing a computer to execute a process, the process comprising:

recognizing, in a case where image data of a first document and image data of a second document are generated, the type of the first document from the image data of the first document and recognizing the type of the second document from the image data of the second document using an image recognition method corresponding to the type of the first document among image recognition methods of a plurality of types, the first document and the second document being included in a plurality of documents;

in a case of recognition of the type of the first document, trying to recognize the type of the first document by changing the image recognition method to another until recognition of the type of the first document becomes successful;

reading sheets of a plurality of documents one by one in a certain order; and in a case where image data of a document read first is treated as the image data of the first document and where the type of the first document is not recognized from the image data of the first document, trying to recognize the type of the first document by treating image data of a document read last as the image data of the first document.

\* \* \* \* \*